UNITED STATES PATENT OFFICE.

JOHN C. HOWARD, OF CHICAGO, ILLINOIS, ASSIGNOR OF ONE-HALF HIS RIGHT TO FRANK S. WATERS, OF SAME PLACE.

IMPROVEMENT IN PROCESSES OF PRESERVING MEATS, &c.

Specification forming part of Letters Patent No. 184,154, dated November 7, 1876; application filed September 9, 1876.

*To all whom it may concern:*

Be it known that I, JOHN C. HOWARD, of Chicago, in the county of Cook and State of Illinois, have invented a new and valuable Improvement in Process of Preserving Meats; and I do hereby declare that the following is a full, clear, and exact description of the construction and operation of the same.

The object of this invention is to preserve meat in cans cheaply and effectually, and this object is accomplished by the process hereinafter described.

I first dissolve salicylic acid in hot glycerine. I then add hot water to the solution or mixture, and stir the said ingredients thoroughly together. I then put a small amount of this mixture into each one of a number of ordinary tin preserving-cans, and shake well each of said cans, so as to give its interior a thorough coating. I then place in said cans the meat (either raw or cooked) which is to be preserved, seal the said cans hermetically, and pass them through a steam bath or hot-water bath.

The advantage of this process is that, while the chief ingredient of the mixture used (salicylic acid) is not injurious in small quantities, it is a very powerful antiseptic, and will destroy any germs that may be lurking in the meat, or else prevent them from being vivified, thereby guarding against putrefaction.

The proportions of the different ingredients used may vary considerably, it being necessary only that enough of the salicylic acid should be used to accomplish the purpose designed, and enough of the glycerine and water to keep the mixture in a semi-fluid and adhesive state.

Any other convenient mode of application may be substituted for that stated.

The process may be applied to any vessels adapted to the purpose designed, as well as to cans.

Any other substance may be preserved as well as meat; and the described process may be varied in some additional particulars without departing from the spirit of my invention.

What I claim as new, and desire to secure by Letters Patent, is—

The process of preserving meat and other perishable substances, by first dissolving salicylic acid in hot glycerine, and mingling hot water therewith; then coating the inside of the preserving-cans with the mixture thus made; then sealing hermetically in said cans the meat or other substances to be preserved; and, finally, subjecting said cans to a bath of hot water or steam, all substantially as set forth.

In testimony that I claim the above I have hereunto subscribed my name in the presence of two witnesses.

JOHN C. HOWARD.

Witnesses:
FRANK H. ROOD,
ED. PATTIANI.